United States Patent
Kelly et al.

(10) Patent No.: US 10,812,512 B1
(45) Date of Patent: Oct. 20, 2020

(54) SPECTRUM SENSING FALSIFICATION DETECTION IN DENSE COGNITIVE RADIO NETWORKS

(71) Applicant: Government of the United States, as Represented by the Secretary of the Air Force, Rome, NY (US)

(72) Inventors: John J. Kelly, Manlius, NY (US); Jonathan Ashdown, Greenwich, NY (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 196 days.

(21) Appl. No.: 16/157,738

(22) Filed: Oct. 11, 2018

Related U.S. Application Data

(60) Provisional application No. 62/655,353, filed on Apr. 10, 2018.

(51) Int. Cl.
*G08B 23/00* (2006.01)
*G06F 12/16* (2006.01)
*G06F 12/14* (2006.01)
*G06F 11/00* (2006.01)
*H04L 29/06* (2006.01)
*H04W 12/12* (2009.01)
*G06F 16/29* (2019.01)

(52) U.S. Cl.
CPC .......... *H04L 63/1425* (2013.01); *G06F 16/29* (2019.01); *H04W 12/12* (2013.01)

(58) Field of Classification Search
CPC ..... H04L 63/1425; G06F 16/29; H04W 12/12

USPC .......................................................... 726/23
See application file for complete search history.

(56) References Cited

U.S. PATENT DOCUMENTS

2009/0243841 A1* 10/2009 Alsafadi .............. A61B 5/0022
340/539.22
2009/0247201 A1* 10/2009 Ye ......................... H04W 16/14
455/509

(Continued)

OTHER PUBLICATIONS

M. Kamel, W. Hamouda, and A. Youssef, •Ultra-dense networks: A survey. IEEE Communications Surveys Tutorials, vol. 18. pp. 2522-2545, Fourth quarter 2016.

(Continued)

*Primary Examiner* — Monjur Rahim
(74) *Attorney, Agent, or Firm* — Adam G Pugh

(57) ABSTRACT

Systems and associated methods for detecting a set of spectrum sensing falsification (SSF) attacks in a geographic database (GDB) driven cognitive radio (CR) system. Viewing the GDB as a type of non-orthogonal compressive sensing (CS) dictionary, the composite power spectral density (PSD) estimate at a candidate CR is approximated by a small number of sensor nodes listed in the GDB. In a dense CR network, the PSD estimate at a CR may contain a composite mixture of spectrally overlapping signals. An implementation of an optimized, greedy algorithm orthogonal matching pursuit (OMP) returns a set of sensor nodes which are suspected to be in the vicinity of the CR. A sufficient match between the PSD estimate reported by a candidate CR and the PSD that is sparsely approximated from the SNs in its area provides confidence (trust) metrics which may be used to detect potential SSF attacks.

20 Claims, 9 Drawing Sheets

(56) References Cited

U.S. PATENT DOCUMENTS

| | | | | |
|---|---|---|---|---|
| 2010/0069013 A1* | 3/2010 | Chaudhri | ............... | H04W 16/14 455/67.11 |
| 2012/0083218 A1* | 4/2012 | Gossain | ............... | H04B 17/318 455/67.11 |
| 2016/0057637 A1* | 2/2016 | Imana | ..................... | H04B 1/001 370/252 |
| 2017/0237484 A1* | 8/2017 | Heath | .................. | H04B 1/1027 398/26 |
| 2020/0128473 A1* | 4/2020 | Jing | ....................... | H04W 48/16 |

OTHER PUBLICATIONS

M. Grissa, B. Hamdaoui, and A. A. Yavuz.a, "Location privacy in cognitive radio networks: A survey," IEEE Communications Surveys Tutorials, vol. 19, No. 3. pp. 1726-1760. 2017.

S. K. Sharma, E. Lagunas, S. Chatzinotas, and B. Ottersten, "Application of compressive sensing in cognitive radio communications: A survey," IEEE Communications Surveys Tutorials, vol. 18, pp. 1838-1860, 2016.

B. A. Jayawickrama, E. Dutkiewi,cz I. Oppermann, G. Fang, and J. Ding, "Improved performance of spectrum cartography based on compressive sensing in cognitive radio networks." in 2013 IEEE International Con-ference on Communications (ICC), pp. 5657-5661, Jun. 2013.

B. A. Jayawickrama, E. Dutkiewicz. I. Oppermann, and M. Mueck, "Iteratively reweighted compressive sensing based algorithm for spectrum cartography in cognitive radio networks," in 2014 IEEE Wireless Communications and Networking Conference (WCNC), pp. 719-724, Apr. 2014.

J. A. Bazerque and G. B. Giannakis, "Distributed spectrum sensing for cognitive radio networks by exploiting sparsity," IEEE Transactions on Signal Processing, vol. 58, pp. 1847-1862, Mar. 2010.

S. Y. Shih and K. C. Chen, "Compressed sensing construction of spectrum map for routing in cognitive radio networks," in 201J IEEE 73rd Vehicular Technology Conference (VTC Spring). pp. 1-5, May 2011.

C. Feng, S. Valaee, and Z. Tan "Multiple target localization using compressive sensing," GWBECOM 2000, 2009 IEEE Global Telecommunications Conference, pp. 1-6, Nov. 2009.

G. Li, Z. Zhu, D. Yang, L. Chang. and H. Bai, "On projection matrix optimization for compressive sensing systems," IEEE Transactions on Signal Processing. vol. 61. pp. 2887-2898, Jun. 2013.

M . Mishali and Y. C. Eldar. "From theory to practice: Sub-nyquist sampling of sparse wideband analog signals," IEEE Journal of Selected Topic • in Signal Processing, vol. 4, pp. 375-391, Apr. 2010.

R. Murty, R. Chandra , T. Moscibroda, and P. Bahl, •Senseless: A database-driven white spaces network. IEEE Transactions on Mobile Computing, vol. II, pp. 189-203, Feb. 2012.

N. Wang, Y. Gao, and B. Evans, "Database-augmented spectrum sensing algorithm for cognitive radio," in 2015 IEEE International Conference on Comn11micatio11s (ICC), pp. 7468-7473. Jun. 2015.

E. Troja and S. Bakiras, "Efficient location privacy for moving clients in database-driven dynamic spectrum access," in 2015 24th International Conference on Computer Communication and Networks (ICCCN), pp. 1-8, Aug. 2015.

L. Zhang. C. Fang. Y. Li , H. Zh, u and M. Dong, "Optimal strategies for defending location inference attack in database-driven ems," in 2015 IEEE International Conference on Communications (ICC), pp. 7640-7645. Jun. 2015.

J. Lee and R. Buehrer, "Security issues for position location." in Hand-book of Position Location: Theory. Practice, and Advances(S. Zekavat and R. Buehrer, eds.), ch. 3, pp. 67-104, John Wiley and Sons Publishers, 2012.

Z. Chen. L. Chen, and H. Zhong, "Towards secure and verifiable database-driven spectrum sharing," in 2017 47th Annual IEEEI IFIP International Conference on Dependable Systems and Networks (DS,N) pp. 285-296. Jun. 2017.

M. Guarnieri , S. Marinovic, and D. Basin, "Securing databases from probabilistic inference," in 2017 IEEE 30th Computer Security Foundations Symposium (CSF), pp. 343-359, Aug. 2017.

T. C. Clancy and N. Goergen. "Security in cognitive radio networks: Threats and mitigation," in 2008 3rd International Conference on Cognitive Radio Oriemed Wireless Networks and Communications (Crow11-Com 2008), pp. 1-8. May 2008.

R. Campos and L. Lovisolo, "Rf fingerprinting location techniques." in Handbook of Position Location: Theory, Practice, and Advances (S. Zekavat and R. Buehrer, eds.), ch. 15.' pp. 487-520, John Wiley and Sons Publishers, 2012.

Jae-Hoon Kim and Woon-Young Yeo, "A coherent data filtering method for large scale RF fingerprint Wi-Fi Positioning Systems," EURASIP Journal on Wireless Communications and Networking, Dec. 2014.

J. A. Tropp. "Greed is good: algorithmic results for sparse approximation." IEEE Transactions on Information Theory, vol. 50, pp. 2231-2242, Oct. 2004.

R. Baraniuk, M . Davenpon, R. Devore, and M. Wakin. "A simple proof of the restricted isometry property for random matrices," Journal of Constructive Approximation, vol. 28, No. 3. pp. 253-263, 2008.

M. Davenport. M. Duarte, Y. Eldar, and G. Kutyniok, "Introduction to compressive sensing," in Compressed Sensing : Theory and Applications (Y. Eldar and G. Kutyniok . eds .), ch. I, pp. 1-68, Cambridge University Press, 2012.

S. Li and G. Ge, "Deterministic sensing matrices arising from near orthogonal systems," IEEE Transactions on Information Theory, vol. 60. pp. 2291-2302. Apr. 2014.

M. Elad, "Optimized projections for compressed sensing," IEEE Transactions on Signal Processing, vol. 55, pp. 5695-5702, Dec. 2007.

K. Schnass and P. Vandergheynst. Dictionary preconditioning for greedy algorithms-; IEEE Transactions on Signal Processing, vol. 56. pp. 1994-2002, May 2008.

J. M. Duarte-Carvajalino and G. Sapiro, "Learning to sense sparse signals: Simultaneous sensing matrix and sparsifying dictionary optimization," IEEE Transactions on linage Processing,vol. 18, pp. 1395-1408, Jul. 2009.

B. Bahrak, S. Bhattarai, A. Ullah, J. J. Park, J. Reed and D. Gurney, "Protecting the primary users' operational privacy in spectrum sharing," 2014 IEEE International Symposium on Dynamic Spectrum Access Networks (DYSPAN), McLean, VA, 2014, pp. 236-247.

P. Qian, Y. Guo, N. Li, M. Yu and Z. Chen, "An improved sensor deployment scheme for multiple target localization using compressive sensing," 2015 IEEE 5th International Conference on Electronics Information and Emergency Communication, Beijing, 2015, pp. 384-387.

Z. Gao, H. Zhu, Y. Liu, M. Li and Z. Cao, "Location privacy in database-driven Cognitive Radio Networks: Attacks and countermeasures," 2013 Proceedings IEEE INFOCOM, Turin, 2013, pp. 2751-2759.

S. U. Rehman, K. W. Sowerby and C. Coghill, "Radio-frequency fingerprinting for mitigating primary user emulation attack in low-end cognitive radios," in IET Communications, vol. 8, No. 8, pp. 1274-1284, May 22, 2014.

* cited by examiner

SPECTRUM SENSING FALSIFICATION DETECTION IN DENSE COGNITIVE RADIO NETWORKS

CROSS-REFERENCE TO RELATED APPLICATION

This non-provisional patent application claims the benefit of U.S. Provisional Application No. 62/655,353 filed on Apr. 10, 2018 and titled Spectrum Sensing Falsification Detection In Dense Cognitive Radio Networks, the entire content of which is incorporated herein by reference.

STATEMENT OF GOVERNMENT INTEREST

The invention described herein may be manufactured, used, and licensed by or for the Government of the United States for all governmental purposes without the payment of any royalty.

BACKGROUND

Dynamic spectrum access (DSA) technologies, such as software-defined radio, enable efficient use of spectral resources in cognitive radio network (CRN) systems. To deliver 5G wireless services and associated quality of service (QoS) required, additional bandwidth above what is currently licensed in the mobile network market likely will be needed. As wireless densification becomes a reality, large metropolitan areas likely will see heterogeneous dense and ultra-dense networks emerge. The accumulation of more users, proliferation of more systems, and limitation of available bandwidth likely will need to be optimally addressed.

Various CRN network designs have been the focus of ongoing study in the art (e.g. proposed CRN architectures include underlay, overlay, and interweave systems). Many of these architectures involve spectrum sharing of unused or intermittently-used spectrum among primary users (PU) and secondary users (SU). Spectrum sharing may be utilized to expand the available number of channels at some nominal bandwidth. However, with sensor densification and increasingly prevalent channel overlap and reuse (in particular, for microcellular and picocellular networks), CRN computational and logistical requirements may increase exponentially to the point that the number of sensors exceeds the number of fixed channels. In addition, the potential for co-channel interference as seen by cognitive radios (CR) in overlapped coverage areas increases dramatically in this scenario.

As a matter of definition, FIGS. 1, 2A, 2B, 2C and 2D illustrate an exemplary cognitive radio network (CRN) architecture known in the prior art. For example, and without limitation, FIG. 1 depicts a generic front-end processing chain 100 of a cognitive radio sensor. A radio frequency (RF) front end 102 may comprise circuitry between a receiving antenna 115 and a mixer stage of a receiving sensor. The RF front end 102 may process (e.g., convert) a signal at an original incoming RF, after which an analog to digital converter (ADC) 104 may sample the incoming signal at a rate sufficient for capturing the entire bandwidth of interest. After the ADC 104, spectrum estimation 106 may be performed. To help mitigate the high data rate resulting from performing spectrum estimation 106 on a dense input signal, multiple spectral channelized sub-bands may be combined into bins to reduce the data rate before thresholding 108 may be performed. The number of sub-bands combined may depend upon the ADC sample rate and the bandwidth of signals intending to be sensed. The result may be a column vector of bins where each bin contains the spectral power within each sub-band. This column vector is referred to hereinbelow as the spectrum report 125. The spectrum report 125 may contain a coarse power spectral density (PSD) estimate at a reduced sample rate. The power spectrum range and sub-band subdivision (e.g. channel width and number of channels) in the spectrum report 125 may be presumed common and known to all entities in the CRN.

Relying on spectrum sensing reports generated from a single sensor in a dense network may be unreliable due to, for example, and without limitation, obstructions in the path of the signal, signal fading, receiver physical constraints and traffic loading considerations. Collaborative sensing may help to overcome such single-sensor impairments. Specifically, integrated spectrum measurement sensor reports from multiple sensors may be fused to reconstruct the local spectrum for the purpose of ascertaining whether a given SU is to be trusted or denied access to the system.

Referring now to FIG. 2A, an exemplary collaborative CRN 200 known in the art is now described in more detail. By way of definition, a potential SU is a CR that issues a spectrum request and is referred to as a candidate CR 202. The candidate CR 202 may be assumed to reside in a geographic area among many other emitting SUs 204 as well as a set of sensors 206 each associated with a respective sensitivity region 208. These sensors 206 may sense spectrum for the purpose of verifying new candidate CRs and are called sensor nodes (SNs) 206. In lieu of SUs, SNs 206 may alternatively be a dense set of fixed sensors that may form part of the CRN 200 infrastructure. Spectrum reports 125 sensed by each SN 206 may contain spectrum from that subset of the CR emitters 204 (referred as local CR emitters) located within the SN sensitivity region 208 of the SN 206. As used herein, SNs 206 so employed may be referred to as trusted SNs, as they may be assumed to adequately sense the CR and to honestly report sensing results by collaboratively forwarding each other's spectrum reports to a centralized Fusion Center (FC) 210.

The FC 210 may maintain a geographic database (GDB) containing the respective spectrum report 125 of each trusted SN 206 in the coverage area (defined as a combination of the respective sensitivity regions 208 of all trusted SNs 206 in the CRN 200). The GDB, built and updated via collaborative energy detection-based spectrum sensing, may be maintained by a controlling spectrum broker centrally located at the FC 210. Still referring to FIG. 2A, and referring additionally to FIG. 2B, the set of all spectrum reports t, 220 collected over the coverage area may be stored in the GDB at the FC 210 (e.g., the spectrum reports may be collaboratively forwarded to the centralized FC 210 and collected column-wise to form the GDB).

More specifically, a GDB may contain channel indexes and associated spectral power as estimated at sensor nodes (SN) 206 which may be scattered in a region surrounding the CR. The GDB considered herein contains SN index, occupied channel index, and estimated power. The GDB may be viewed as an over complete (i.e., redundant) N×M real non-negative matrix (for N<M). Each spectrum sensing report generated by a given SN may comprise a subset of the GDB (i.e., each column of the GDB may represent the channels sensed by a particular SN and each row may represent a frequency or channel). Each entry in the matrix may represent the power estimated at the $i^{th}$ channel by the $j^{th}$ SN. The entries in the GDB may be thresholded such that measured power below some fixed threshold is set to zero.

Although the GDB is actually a dynamic function of time, the assumption herein is that the CRN's channel usage is stationary during the duration of the CR's channel acquisition and that the GDB accurately reflects the current spectrum usage in the coverage area.

Referring now to FIG. 2C, a candidate CR 202 may broadcast a request to nearby trusted SNs 206 (as shown along the dashed lines) for available spectrum. The spectrum request 125 is then collaboratively forwarded (as shown along the solid lines) to the FC 210 where the identifiers (IDs) of the SNs 206 that first sensed the request are collected in a set $S_{TRUE}$ 230 containing SN IDs local to the candidate CR 202. The trusted SNs 206 then forward the request to the FC 210, which receives the request and notes the ID of the SNs that first received the candidate CR's spectrum request 125. As such, the SNs 206 are interpreted as sectorized base stations which feed into the FC 210 and report on spectrum usage throughout the system service (coverage) area. FIG. 2D illustrates exemplary differences between handling scenarios for spectrum sensing reports from varyingly-positioned candidate CRs and surrounding sensor nodes.

While collaborative spectrum sensing aids in a variety of CR tasks, this technique also renders a CR system vulnerable to spectrum sensing falsification (SSF) attacks. Three types of SSF attacks of interest in the context of the present disclosure are spectrum spoofing (i.e., sending spectrum sensed from a different node), spectrum inversion (i.e., flipping sensed spectrum), and spectrum shifting (i.e., sending a shifted version of spectrum sensed). In a spoofing scenario, a malicious CR may use some technique (e.g., a high-gain antenna) to intentionally obfuscate its position to the FC 210, thereby reporting its position to the FC 210 as being in one location when the malicious CR actually resides in a different location. The issue of location verification is important when a CR queries the FC 210 for available channels in its area. The FC 210 must verify the location of the requesting CR prior to granting it access to channels. If the candidate CR is deemed trusted, then the FC 210 may also choose to use its reported spectrum to update the GDB. The CR desires the requested bandwidth and the FC 210 requires the CR location (at least to some level of precision and/or anonymity). Opposing requirements may exist, such as the candidate CR being reluctant to give up its specific location versus the FC 210 needing to verify the CR's location for reasons of security. If the CR is willing to share its rough geographical location only with the FC 210 and does not want to risk interception of its location information as it is passed to the FC 210, then there is a need for an efficient and secure way for the CR to do so. Sending sensing reports to the FC 210 which contain environmental sensing data reflective of the local channel usage as sensed by the CR is one way for the FC 210 to infer the candidate CR's location. In a spectrum inversion scenario, a malicious SU may invert its sensing results prior to reporting them. Doing so may cause otherwise available spectrum to appear used and active spectrum to appear available, thereby reducing availability and creating the potential for interference, respectively. The graph 500 at FIG. 5 depicts a specific example of spectrum inversion. Spectrum shifting is subtler than the other two forms of attack in that the shifted spectrum may share similar overall characteristics (e.g., energy, sparsity, bandwidth) with spectrum from other locations. The graph 600 at FIG. 6 depicts a specific example of spectrum shifting.

BRIEF DESCRIPTION OF THE DRAWINGS

The accompanying drawings provide visual representations which will be used to more fully describe various representative embodiments and can be used by those skilled in the art to better understand the representative embodiments disclosed and their inherent advantages. The drawings are not necessarily to scale, emphasis instead being placed upon illustrating the principles of the devices, systems, and methods described herein. In these drawings, like reference numerals may identify corresponding elements.

DETAILED DESCRIPTION

Figure 1:
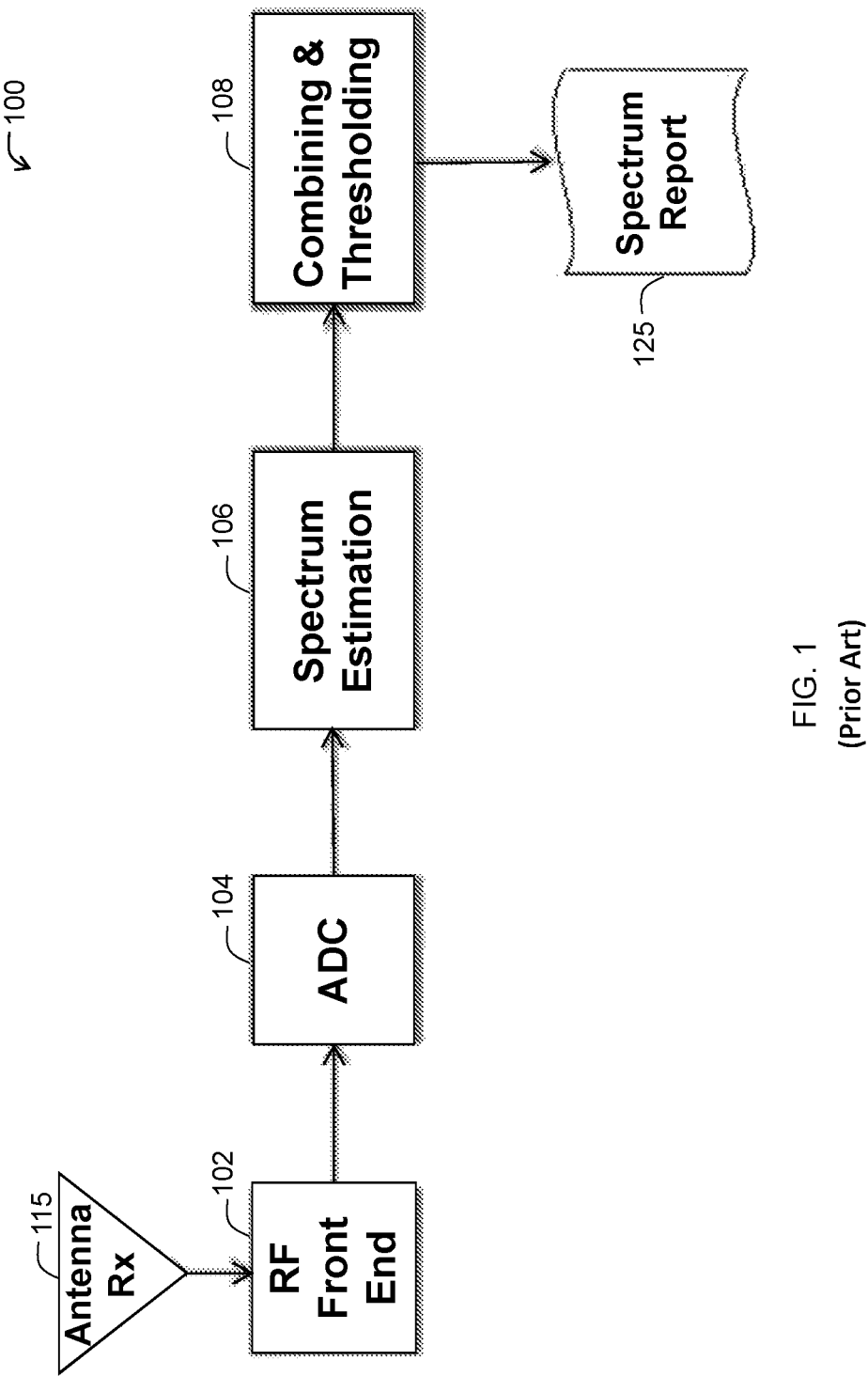
FIG. 1 is a generic front-end processing chain of an exemplary cognitive radio sensor known in the prior art.

Specific embodiments of the disclosure will now be described in detail with reference to the accompanying figures. While this invention is susceptible of being embodied in many different forms, there is shown in the drawings and will herein be described in detail specific embodiments, with the understanding that the present disclosure is to be considered as an example of the principles of the invention and not intended to limit the invention to the specific embodiments shown and described. In the description below, like reference numerals may be used to describe the same, similar or corresponding parts in the several views of the drawings.

The present disclosure relates generally to systems and associated methods of employing a variant of orthogonal matching pursuit (OMP) to detect spectrum sensing falsification (SSF) attacks in the reported spectrum of a requesting CR. The disclosed OMP variant may be used to de-mix the composite reported spectrum and to use spectrum reports from sensor nodes (SNs) with overlapped coverage regions to reconstruct the reported spectrum as a linear combination of SN reports. The number of trusted SNs utilized by the present method is taken to be much less than the total number of emitters in the coverage area of interest. Also, the Fusion Center (FC) is presumed to know the geographic location of the SNs (e.g. through GPS or other means).

Sparsity in the context of this disclosure translates to the relatively few SNs that may be needed to approximate the reported spectrum of an honest CR. Traditional CS utilizes a randomly-generated sensing matrix to achieve the desired compression without distorting the orthonormal basis (ONB) dictionary. In certain embodiments of the present SSFD method, sensing matrix optimization may be applied which strives to orthogonalize the non-orthogonal GDB dictionary. In addition, the disclosed sensing matrix may be chosen with pseudorandom components, which may provide some level of anonymity for the candidate CR. The resulting disclosed sensing matrix may act to simultaneously deliver one or more of the following advantages:

1) Obfuscate the spectrum of a candidate CR from other users;
2) Compressively reduce the communications overhead of having to report the spectrum to the FC;
3) Reduce the computational burden of OMP; and
4) Optimally separate the non-orthogonal components of the GDB dictionary One embodiment of the present disclosure, for example, and without limitation, may comprise a software process that may operate in collaboration with FC control operations known in the art. A candidate CR may broadcast a spectrum request to a relatively small number of SNs in its area, which may collaboratively forward the request to the FC. Once the FC receives the spectrum request, the present computer-implemented method may then generate a pseudo-random sensing matrix and forward it to the candidate CR requesting the spectrum. The CR may sense its local spectrum, compress it using the sensing matrix from the FC, and send the compressed spectrum to the SNs which may then forward the compressed spectrum to the FC. The FC may then compare the reported spectrum to the spectrum in the GDB and ascertain if the latter matches up with the spectrum reported from the SNs that are local to the candidate CR. The extent to which the spectrum matches other local SNs may be interpreted as a trust metric for the candidate CR. If the spectrum matches with multiple other SNs in the coverage area far away from SNs which initially received the spectrum request, then the location of the candidate CR, as well as its intent, comes into question.

Operating on a compressed PSD via multiplication with a pseudorandom matrix may advantageously reduce the PSD reconstruction complexity and reduce network traffic load while simultaneously providing some obfuscation of the GDB. Spectrum report obfuscation may advantageously protect against a third party inferring the users' spectrum. The method used to match spectrum reported from the candidate CR and SN spectrum must be robust to differences in frequency support due to possibly stale entries in the GDB, as well as the possible blockage of emitters to the CR via obstructions or terrain. Utilizing an optimal sensing matrix may advantageously increase the robustness of the disclosed method to such discrepancies.

The method presented herein matches a receiver's PSD to the joint frequency pattern sensed by a small number of local SNs close to the receiver. Many active transmitters may exist, but the number of spectrum reports from trusted nodes that are required to adequately approximate the candidate CRs estimated PSD is assumed sparse. The PSD reported over a finite set of channels (whether occupied by other SUs or the PU itself) may be used as a feature vector to assess the candidate CR.

Figure 3:
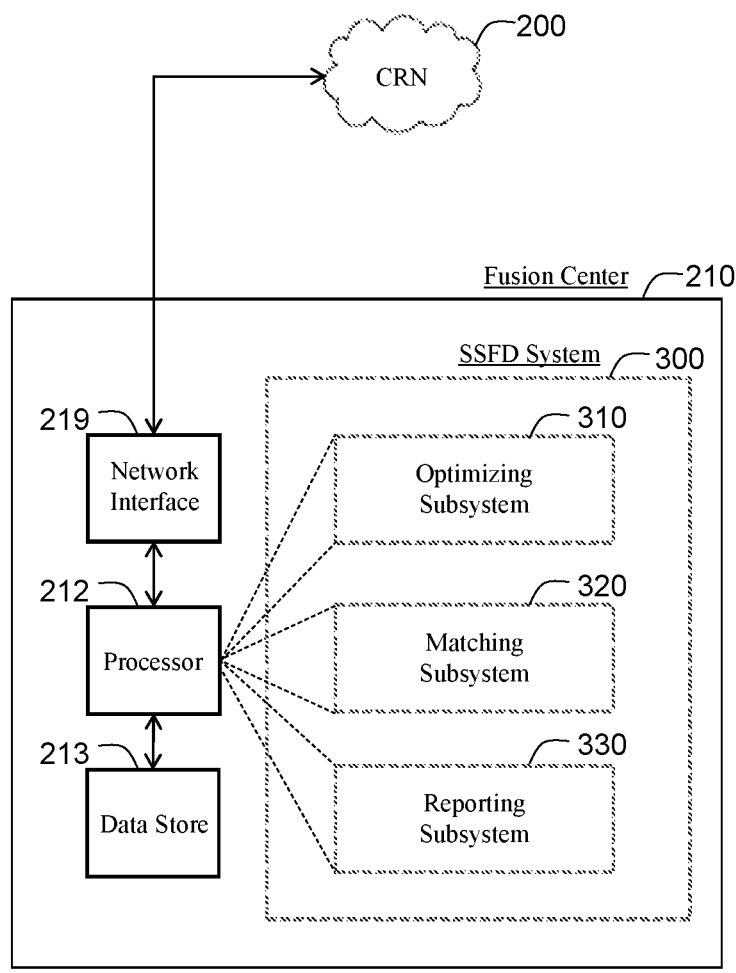
FIG. 3 is a schematic block diagram of a spectrum sensing falsification detection (SSFD) system, in accordance with embodiments of the disclosure.

The block diagram of FIG. 3 illustrates an example embodiment of the present disclosure's Spectrum Sensing Falsification Detection (SSFD) system 300, also referred to as a falsification detection system or simply as a detection system, in accordance with embodiments of the disclosure. Those skilled in the art will understand that the principles of the present disclosure may be implemented on or in data communication with any type of suitably arranged device or system configured to perform Fusion Center (FC) 210 control operations, in any combination. More specifically, the SSFD system 300, according to an embodiment of the present disclosure, may be configured to execute, either commonly or separately, in collaboration with an FC 210 configured in data communication with one or more mobile networks such as a cognitive radio network 200.

Continuing to refer to FIG. 3, in more detail, the Fusion Center (FC) 210 may comprise a processor 212 that may be operable to accept and execute computerized instructions, and also a data store 213 which may store data and instructions used by the processor 212. More specifically, the processor 212 may be positioned in data communication with some number of the networked devices and may be configured to direct input from such networked devices to the data store 213 for storage and subsequent retrieval. For example, and without limitation, the processor 212 may be in data communication with external computing resources, such as the CNR 200, through a network interface 219. Furthermore, the processor 212 may be configured to direct input received from components of the CRN 200 to the data store 213 for storage. Similarly, the processor 212 may be configured to retrieve data from the data store 213 to be forwarded as output to various components of the CRN 200.

For example, and without limitation, the computerized instructions of the SSFD system 300 may be configured to implement an Optimizing Subsystem 310 which may be stored in the data store 213 and retrieved by the processor 212 for execution. The Optimizing Subsystem 310 may be operable to process, using sensing matrix optimization, spectrum requests received from the CRN 200, and to maintain a geographic database (GBD) as modified by the aforementioned processes. Also for example, and without limitation, the computerized instructions of the SSFD system 300 may be configured to implement a Matching Subsystem 320 which may be stored in the data store 213 and retrieved by the processor 212 for execution. The Matching Subsystem 320 may be operable to compare reported spectrum to spectrum in the GDB to compute trust metrics (e.g., quantifying the extent to which the spectrum matches that reported from SNs that are local to the candidate CR). Also for example, and without limitation, the computerized instructions of the SSFD system 300 may be configured to implement a Reporting Subsystem 330 which may be stored in the data store 213 and retrieved by the processor 212 for execution. The Reporting Subsystem 330 may be operable to flag and/or act upon the trust metrics for a given spectrum request (e.g., generate automatic denial and/or mitigation of suspected malicious activity).

Those skilled in the art will appreciate that the present disclosure contemplates the use of computer instructions and/or systems configurations that may perform any or all of the operations involved in SSF detection in a CRN. The disclosure of computer instructions that include Optimizing Subsystem 310 instructions, Matching Subsystem 320 instructions, and Reporting Subsystem 330 instructions is not meant to be limiting in any way. Also, the disclosure of systems configurations that include Fusion Center 210 is not meant to be limiting in any way. Those skilled in the art will readily appreciate that stored computer instructions and/or systems configurations may be configured in any way while still accomplishing the many goals, features and advantages according to the present disclosure.

Figure 2A:
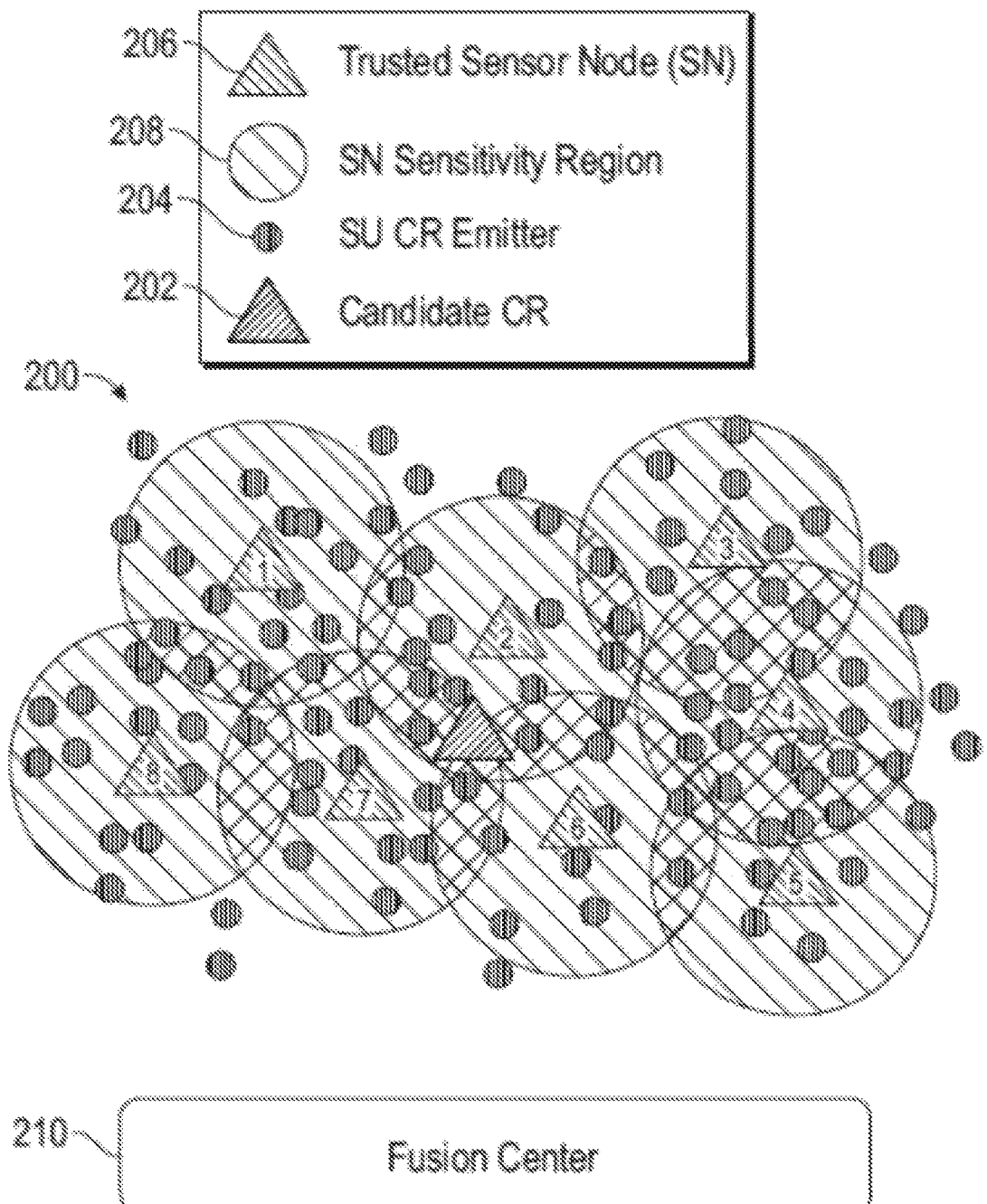
FIG. 2A is a schematic diagram of an exemplary collaborative cognitive radio network (CRN) known in the prior art.
Figure 2B:
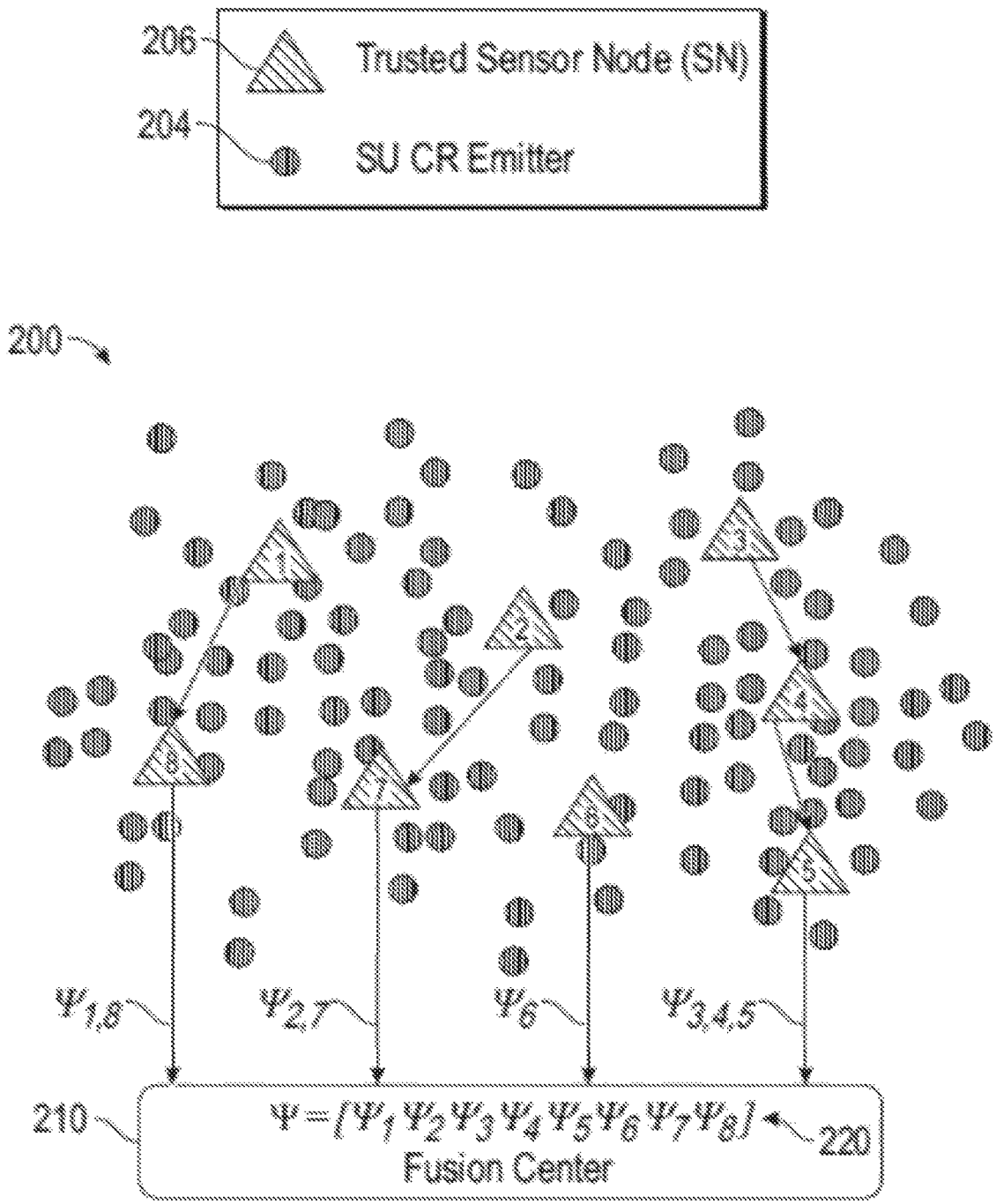
FIG. 2B is a schematic diagram of the exemplary CRN of FIG. 2A implementing spectrum report collection for geographic database (GDB) formulation.
Figure 2C:
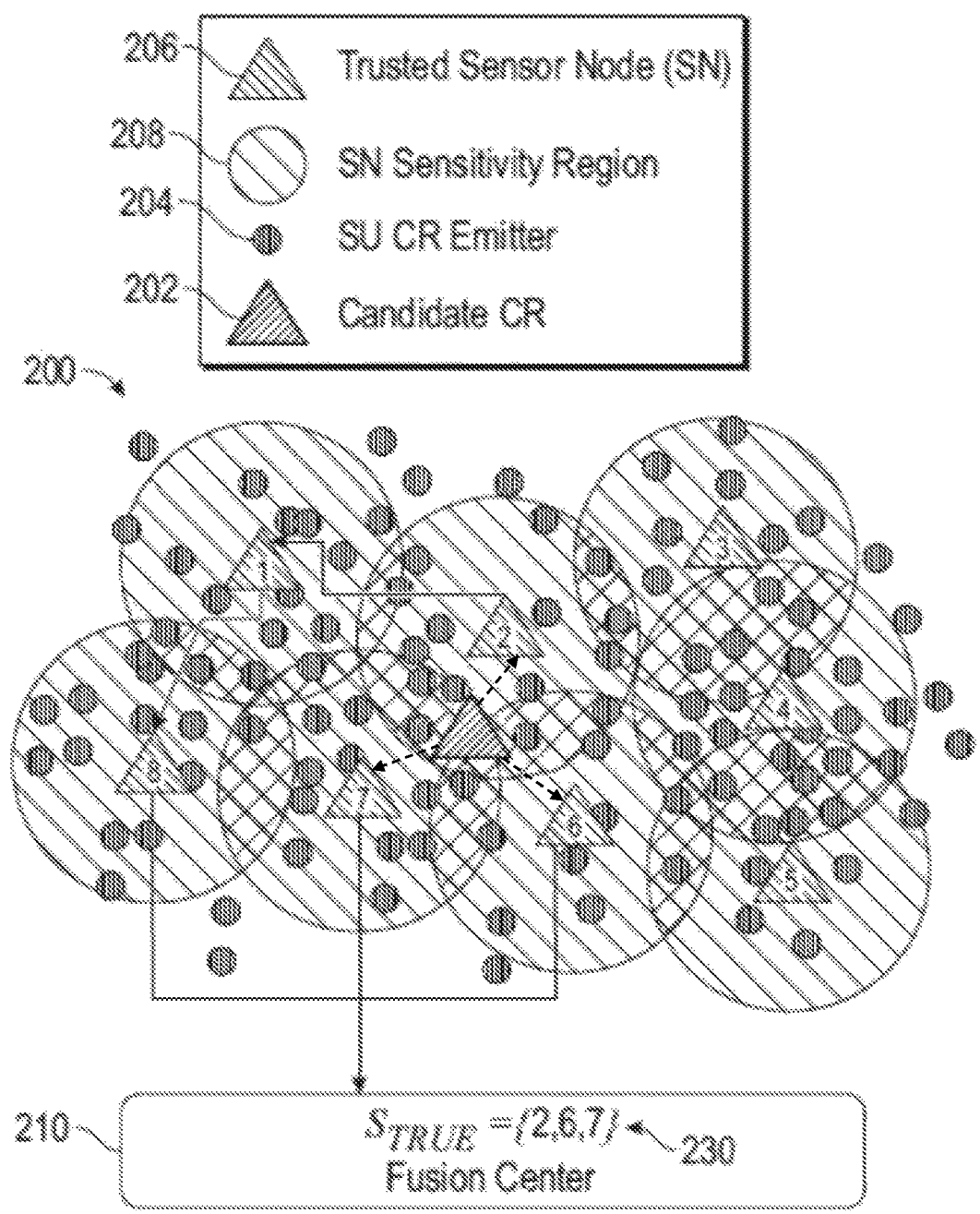
FIG. 2C is a schematic diagram of the exemplary CRN of FIG. 2A implementing spectrum request forwarding from sectorized base stations.

Referring again to FIGS. 2A, 2B, and 2C, a signal model characterizing the behavior of a CRN 200 as supported by embodiments of the present system and method will now be discussed in detail. For example, and without limitation, let $P_{CR}$ be a column vector containing digital received signal strength (RSS) measurements made by a candidate CR, at a sampling rate of $F_S$. Define $P_{CR} \in \mathbb{R}^{N_s}$ to be the digital power spectrum estimate associated with the vector $P_{CR}$. Assume that frequency channelization is applied to the spectrum at the candidate CR such that the spectrum spanning $F_S$ Hz is subdivided into $N=F_S/B$ frequency bins, where each bin is B Hz wide and contains the sum of all signal power within its bandwidth. The resulting channelized spectrum profile is represented as $x \in \mathbb{R}^N$.

Figure 2D:
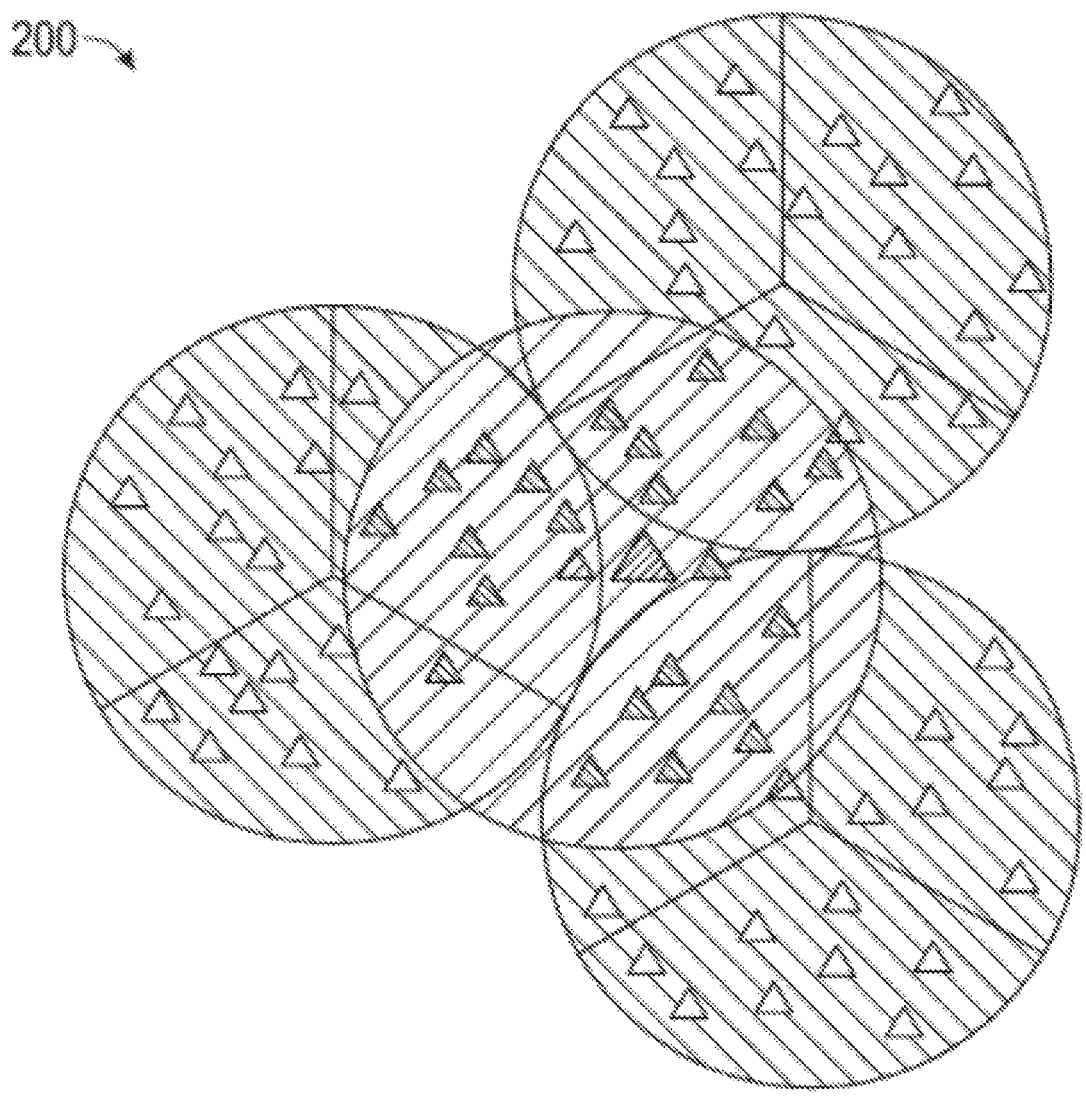
FIG. 2D is a schematic diagram of the exemplary CRN of FIG. 2A implementing varying spectrum report detection and GDB storage scenarios.

Define the number of RF emitters in the coverage area (CA) as $N_e$. The power received at the candidate CR due to the $i^{th}$ emitter is denoted as $L_i P_{T,i}$ where $P_{T,i}$ represents the power transmitted from the $i^{th}$ emitter and $L_i$ represents the signal loss incurred as the signal travels from the $i^{th}$ emitter to the candidate CR. Let $N_{E,CR}$ represent the number of emitters whose signal arrives at the candidate CR above a certain power threshold $P_{thresh}$, where $N_{E,CR} < N_e$. FIG. 2D depicts the $N_{E,CR}$ emitters as lying within the sensitivity region of the candidate CR (indicated by a central circle), whose power at the candidate CR is above $P_{thresh}$.

The power measured at the candidate $CR_{,}p^{CR}$ is then modeled as the sum of power from $N_{E,CR} < N_e$ transmitters after having undergone free-space propagation $$p_{CR} = \sum_{i=1}^{N_{E,CR}} L_i P_{T,i} + n$$

where n is the noise vector for a zero-mean additive white Gaussian noise (AWGN) channel. The present disclosure assumes equal transmit power for all emitters.

In a manner similar to that of the candidate CR, let $P_{SN,j}$ be a column vector containing digital RSS measurements made by the $j^{th}$ SN at a sampling rate of $F_S$. Define $P_{SN,j} \in \mathbb{R}^{N_s}$ to be the digital power spectrum estimate associated with the vector $P_{CR}$. Assume that frequency channelization is then applied to the spectrum at the candidate CR such that the spectrum spanning $F_S$ Hz is subdivided into $N=F_S/B$ frequency bins, where each bin is B Hz wide and contains the sum of all signal power within its bandwidth. The resulting channelized spectrum profile is referred to herein as a spectrum report and is represented as $\psi_j \in \mathbb{R}^N$. For M SNs scattered throughout the CA, $j \in [1, M]$.

The system collaboratively forwards each spectrum report to the FC where all M channelized spectrum profiles $\psi_j$ are collected into a matrix $\psi_j \in \mathbb{R}^{N \times M}$ representing the GDB 412. The $j^{th}$ column of $\psi$ is $\psi_j$ and represents the channelized power spectrum measured at the $j^{th}$ SN $$\psi = [\psi_1 \ldots \psi_M].$$

The disclosed approach involves sparsely approximating the channelized spectrum profile x from the candidate CR (i.e., linearly combining a small fraction of the total number of SN spectrum profiles $\psi_j$ to approximate x). The approximation of x is denoted $\hat{x}$ and can be represented as $$\hat{x} = \Psi s,$$

where s is a k-sparse vector of coefficients, whose magnitude and locations are to be estimated. The approach is to find the best k-term approximation of x in terms of the sparsity of the coefficient s and the Euclidean distance to x. The optimization is formulated as $$\underset{s}{\text{minimize}} \|s\|_0$$
$$\text{subject to } \|x - \Psi s\|_2 \leq \eta.$$

Figure 4:
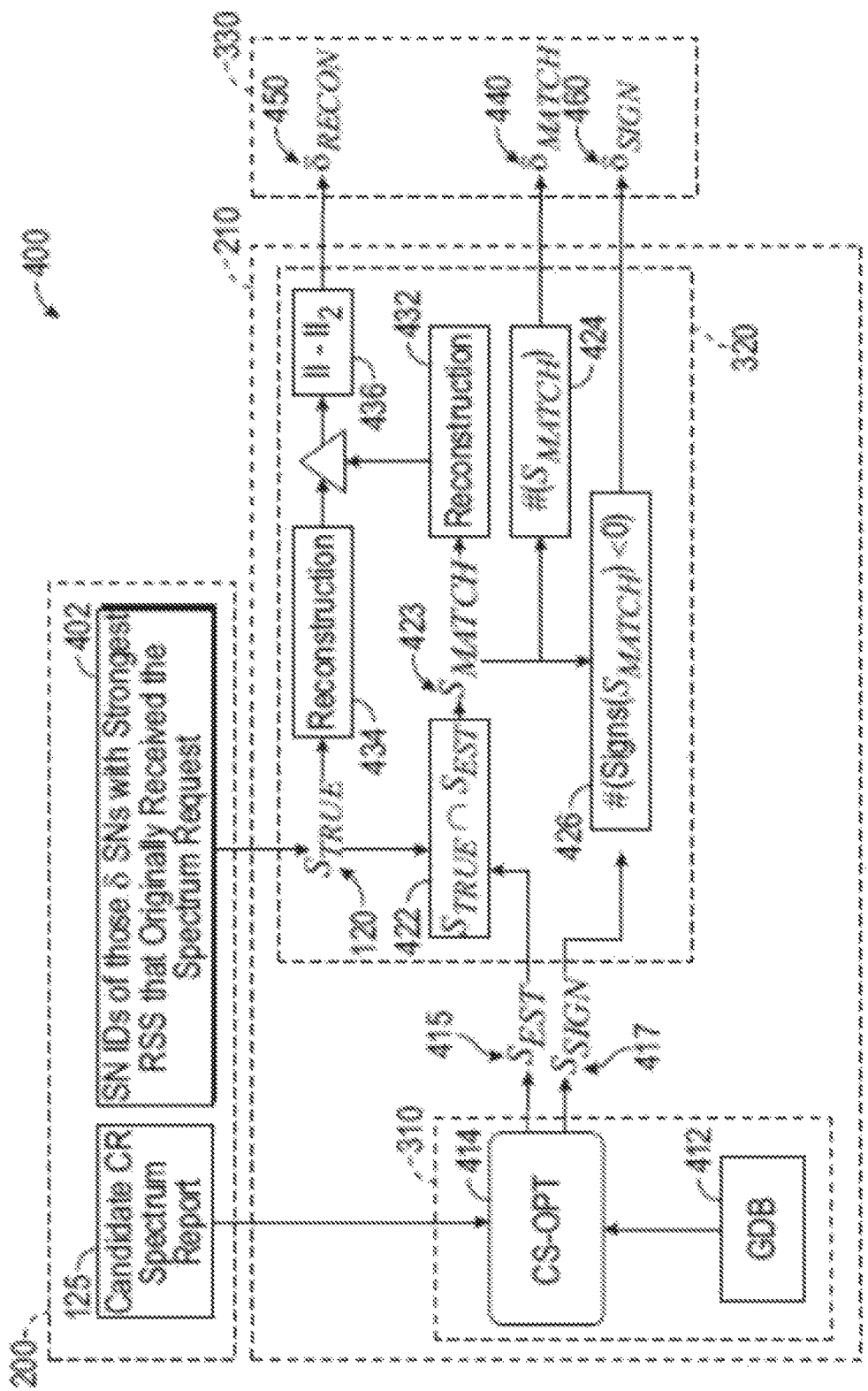
FIG. 4 is a system level functional flowchart illustrating a spectrum sensing falsification detection method, in accordance with embodiments of the disclosure.
Figure 5:
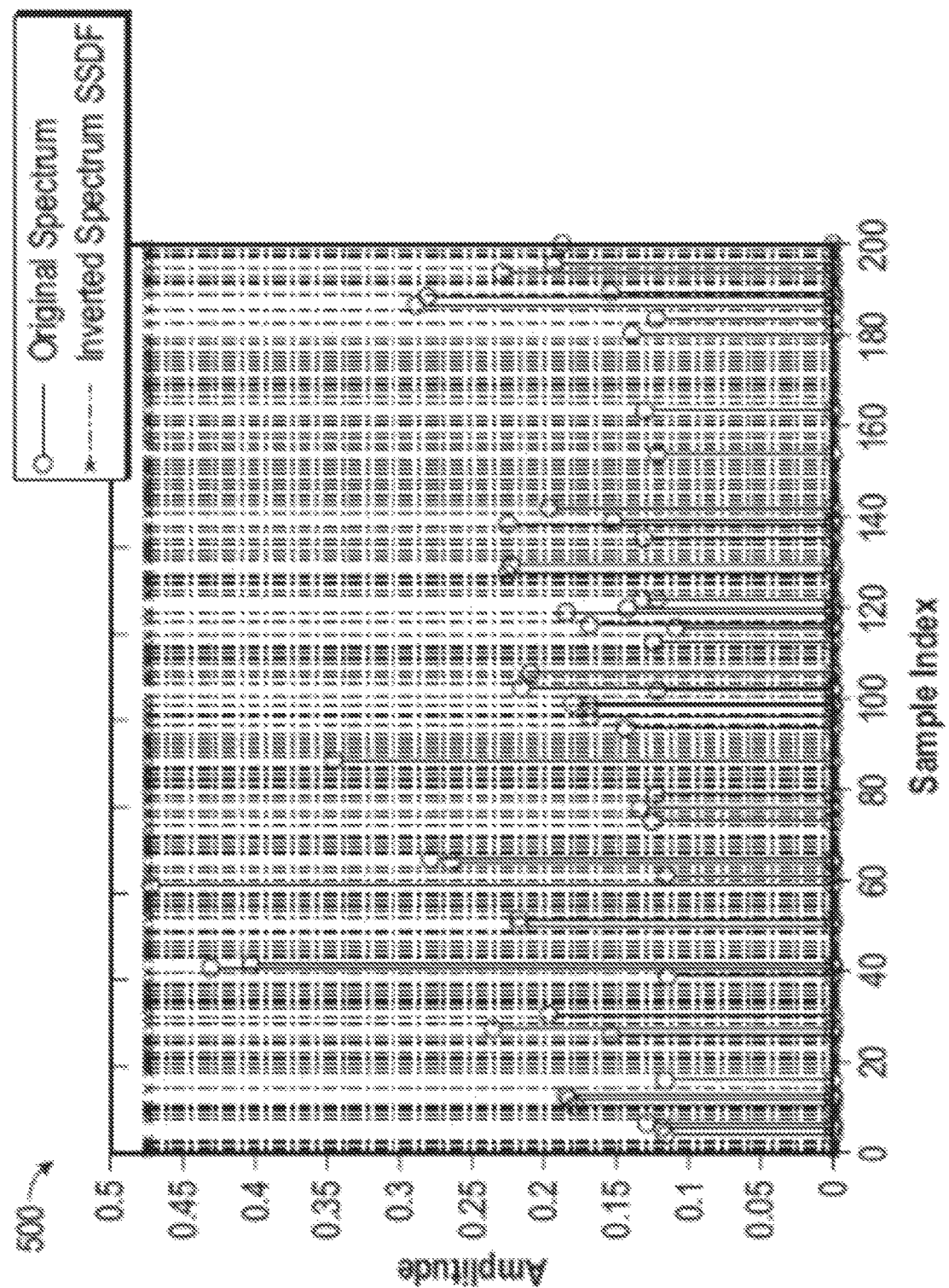
FIG. 5 is a graphical diagram of an exemplary spectrum inversion-type SSF attack.
Figure 6:
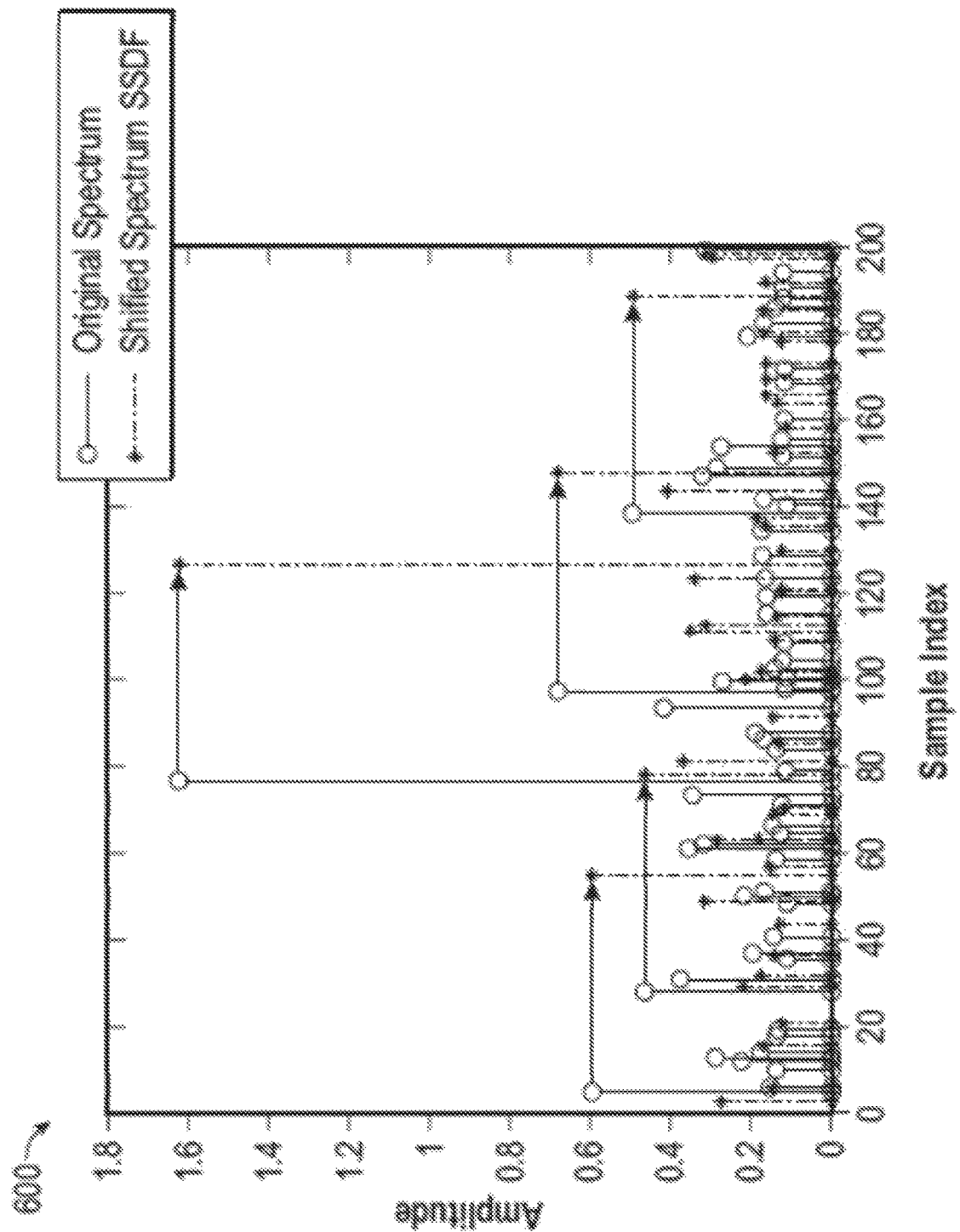
FIG. 6 is a graphical diagram of an exemplary spectrum shifting-type SSF attack.

Referring now to FIG. 4, various computer-implemented methods of the SSFD system 300, as embodied in the Optimizing Subsystem 310, the Matching Subsystem 320, and the Reporting Subsystem 330, will now be discussed in detail. For example, and without limitation, one embodiment of the present method 400 may employ compressive sensing (CS) with Optimized Sensing Matrix (CS-OPT) 414. In non-orthogonal dictionaries, such as the GDB 412, randomly selected sensing matrices have been shown in the art to be less effective in terms of recovery performance when compared with optimized sensing matrices, which are constructed with knowledge of the sparsifying dictionary. Instead of striving to maintain orthogonality (as CS with orthonormal dictionaries does), a sensing matrix design objective in CS with over complete dictionaries is to project the dictionary atoms so as to separate the atoms far apart. A known objective function in optimal CS sensing matrix design strives to minimize the off-diagonal entries of the Gram matrix of the effective dictionary $$\underset{\Phi \in \mathbb{R}^{M \times N}}{\text{minimize}} \|I_L - \Psi^T \Phi^T \Phi \Psi\|_F^2.$$

The effective (or projected dictionary) is the compressed dictionary given by $A = \Phi \psi$. The Gram matrix of the effective dictionary is $$G_A = A^T A.$$

A single measure of atomic separation often used is the Frobenius norm of the off-diagonal elements of the effective dictionary's Gram matrix. While various iterative schemes known in the art have been proposed to find an optimal $\Phi$ for a given $\psi$, a useful known method has derived a general closed-form expression for the optimal sensing matrix in terms of the singular values and left-singular vectors of the dictionary $$\Phi_{opt} = U[I_m 0] \begin{bmatrix} V_{11}^T \Lambda_d^{-1} & 0 \\ 0 & 0 \end{bmatrix} U_d^T,$$

where $U \in \mathbb{R}^{m \times m}$, $V_{11}^T \in \mathbb{R}^{\bar{N} \times \bar{N}}$ are arbitrary orthonormal matrices and the singular value decomposition of the GDB is given by $\Psi = U_d \Lambda_d^{-1} V_d^T$. The sensing matrix $\Phi_{opt}$ is optimal in the sense that, for the given dictionary $\psi$, the sensing matrix $\Phi_{opt}$ minimizes the effective Gram Frobenius norm. The above equation provides a closed-form expression for a class of matrices that satisfy the minimum effective Gram's Frobenius norm.

In one embodiment of applying optimal sensing matrix design to the GDB 412, the FC 210 may generate a pseudo-random orthonormal matrix U, and then perform a singular-value decomposition (SVD) on the GDB 412. The singular values and left-singular vectors returned may then be used to compute an optimal sensing matrix for the GDB 412 which may then be passed to a candidate CR. The candidate CR may then sense its local spectrum, compute the spectrum profile, and transform it by the optimal sensing matrix. The candidate CR then may forward the compressed and obfuscated measurements to the FC 210. With this approach, the SUs channel usage information may be masked in two ways: 1) Pseudo-random Matrix Multiplication, and 2) Non-Invertible Dimensionality Reduction.

Certain methods known in the art for optimal sensing matrix design use a common so-called pre-processing step that acts to orthogonalize the effective dictionary $A = \Phi \psi$. The pre-processing calls for first finding the Moore-Penrose pseudoinverse of A, denoted as $A^+$. Next an orthogonal basis is found for the range of $A^T$. Next, the effective matrix is pre-multiplied by T=QA⁺, where Q=orth($A^T$)$^T$. The processed effective matrix is then $$A_{proc} = TA = QA^+.$$

When orthogonalized, the compressed measurements y=Ax become $$y = A_{proc}Ax$$

$$= QA^+Ax$$

$$= Qx.$$

Now the rows of Q form an orthogonal basis and therefore Q satisfies the restricted isometry property (RIP).

Still referring to FIG. 4, the FC 210 may execute the SSFD system 220 to perform SN matching via OMP to match the reported spectrum with the spectrum in the SN entries (atoms) in the GDB 412 to identify the relevant active SNs. This task is the preliminary problem of model selection; namely identifying a small number of SNs from the GDB 412 whose spectrum best correlates with the candidate CR 202. In one embodiment, the system 220 may operate to identify two SN ID sets: $S_{TRUE}$ 230 and $S_{EST}$ 415. The intersection of these two sets may be used to derive SSF detection metrics.

For example, and without limitation, let the IDs of the SNs in the vicinity of the candidate CR 202 that received the initial spectrum request be collected in a set denoted as $S_{TRUE}$ 230. Let the set of IDs returned from the OMP process be represented by $S_{EST}$ 415. The matched sensor set $S_{MATCH}$ 423 may be defined as the intersection 422 of the set $S_{TRUE}$ 230 and $S_{EST}$ 415 and may be written as $$S_{MATCH} = S_{TRUE} \cap S_{EST}.$$

The cardinality 424 of the matched set 423 may then be defined as $$\delta_{MATCH} = \#(S_{MATCH}).$$

The quantity $\delta_{MATCH}$ 440 may be used as a primary detection metric. This matched sensors metric $\delta_{MATCH}$ 440 may represent the number of SN IDs that lie in the intersection of the sets $S_{TRUE}$ 230 and $S_{EST}$ 415.

Building upon $\delta_{MATCH}$ 440, a second SSF detection metric may be formed by ascertaining whether the reported spectrum correlates positively or negatively with the atoms in the GDB 412. Even if $S_{MATCH}$ 423 contains relatively many SN IDs, indicating a relatively high correlation, an inverted SSF attack may be occurring.

If a high $\delta_{MATCH}$ 440 is observed under the condition that many of the matches were made under a negative correlation, then this may indicate the presence of an inverted spectrum attack. To detect spectrum inversion, the second metric, the reconstruction error metric ($\delta_{RECON}$) 450, may be computed. $\delta_{RECON}$ 450 may be found by comparing a first reconstruction 432 formed from the atoms identified in the matching process (as listed in $S_{MATCH}$ 423) with a second reconstruction 434 formed from the atoms (SNs) in the GDB 412 that are known to be local to the CR (as identified in $S_{TRUE}$ 230). The difference 436 between the reconstructed SN spectrum 432 (returned from OMP) and the 'true' spectrum 434 (reported by the trusted SNs known to be in the immediate vicinity of the CR), is the reconstruction error metric ($\delta_{RECON}$) 450 and may be used as a detection metric for both spectrum shifting and location falsification.

Lastly, looking only at the correlation sign of the atoms that are matched during the CS-OPT process 414 may advantageously detect the presence of spectrum inversion. For example, and without limitation, the CS-OPT algorithm 414 may be configured to capture the sign 417 of the correlation and to reliably detect such spectral inversion attacks using OMP. OMP algorithms employed in designs known in the art typically use the absolute value or square of the correlation, which disregards the sign of the correlation. In order to capture the negativity of the correlation made during OMP, the optimized OMP algorithm 414 of the present disclosure may be modified to store the sign 417 of the correlation made during the OMP matching process. The result is that for each index returned in $S_{EST}$ 415, there is a corresponding binary number indicating the sign $S_{SIGN}$ 417 that the correlation took when the index was selected during the optimized OMP process 414. However, instead of operating on $S_{EST}$ 415, the present disclosure is concerned only with those indices that are known to match the set of true SN indices, and therefore work with those in the matched index set $S_{MATCH}$ 423. A metric $\delta_{SIGN}$ 460 to measure the number of negatively correlated atoms selected during OMP may be formulated by counting the total number of negative correlations 426 occurring in $S_{MATCH}$ 423 and comparing it to the cardinality of the index set, calculated as $$\delta_{SIGN} = \frac{\# \text{ of negative correlations in } S_{MATCH}}{\delta_{MATCH}}$$

where $S_{MATCH}$ 423 and $\delta_{MATCH}$ 440 are as defined above.

It will be appreciated that the systems and methods described above are set forth by way of example and not of limitation. Absent an explicit indication to the contrary, the disclosed steps may be modified, supplemented, omitted, and/or re-ordered without departing from the scope of this disclosure. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context.

Embodiments disclosed herein may include computer program products comprising computer-executable code or computer-usable code that, when executing on one or more computing devices, performs any and/or all of the steps thereof. The code may be stored in a non-transitory fashion in a computer memory, which may be a memory from which the program executes (such as random-access memory associated with a processor), or a storage device such as a disk drive, flash memory or any other optical, electromagnetic, magnetic, infrared or other device or combination of devices. In another implementation, any of the systems and methods described above may be embodied in any suitable transmission or propagation medium carrying computer-executable code and/or any inputs or outputs from same.

DRAWING NUMBER KEY

100 Front-end Processing Chain
102 Radio Frequency (RF) Front End
104 Analog-to-Digital Converter (ADC)
106 Spectrum Estimation Component
108 Combining & Thresholding Component
115 Receiving (Rx) Antenna
125 Spectrum Report
200 Cognitive Radio Network (CRN)
202 Candidate Cognitive Radio (CR)
204 Secondary User (SU) CR Emitter 206 Trusted Sensor Node (SN)
208 SN Sensitivity Region
210 Fusion Center (FC)
212 Processor
213 Data Store
219 Network Interface
220 Set: All Spectrum Reports In Coverage Area
230 Set: IDs of SNs Sensing Spectrum Request ($S_{TRUE}$)
300 Spectrum Sensing Falsification Detection (SSFD) System
310 Optimizing Subsystem
320 Matching Subsystem
330 Reporting Subsystem
400 Functional Schematic Diagram—SSFD Deployment
402 Sensor Node (SN) Request Reporting (SN IDs)
412 Geographical Database (GDB)
414 Compressive Sensing (CS) with Optimized Sensing Matrix
415 Set: IDs of SNs Returned From CS-OPT ($S_{EST}$)
417 Set: Signs of SNs Returned From CS-OPT ($S_{SIGN}$)
422 Operation: Intersection of $S_{TRUE}$ and $S_{EST}$
423 Set: From Intersection of $S_{TRUE}$ and $S_{EST}$ ($S_{MATCH}$)
424 Operation: Cardinality of $S_{MATCH}$
426 Operation: Count Negative Correlations In $S_{MATCH}$
432 Operation: Reconstruction of SNs In $S_{MATCH}$
434 Operation: Reconstruction of SNs In $S_{TRUE}$
436 Operation: Difference Of $S_{MATCH}$ & $S_{TRUE}$ Reconstructions
440 Scalar: From Cardinality of $S_{MATCH}$ ($\delta_{MATCH}$)
450 Scalar: From Difference Of Reconstructions ($\delta_{RECON}$)
460 Scalar: From Negatives Count In $S_{MATCH}$ ($\delta_{SIGN}$)
500 Graph: Spectrum Inversion Example
600 Graph: Spectrum Shifting Example

What is claimed is:

1. A spectrum sensing falsification detection (SSFD) system characterized by a computer processor and by a non-transitory computer-readable storage medium comprising a plurality of instructions defining the system comprising an optimizing subsystem and a matching subsystem which, when executed by the computer processor, the system is configured to:
  record to a geographic database (GDB), using the optimizing subsystem, a respective spectrum report and a respective location associated with each of a plurality of trusted sensor nodes (SNs) each associated with a respective sensitivity region of a cognitive radio network (CRN);
  receive a spectrum request, using the optimizing subsystem, originating from a first subset of the plurality of trusted SNs, defined as local SNs, and associated with a candidate cognitive radio (CR), defined as one of a plurality of secondary user (SU) cognitive radio (CR) emitters each positioned within at least one of the plurality of sensitivity regions;
  record, using the matching subsystem, a respective SN identifier (ID) for each of the local SNs to define a set $S_{TRUE}$;
  create, using the optimizing subsystem, a pseudorandom sensing matrix from the GDB;
  receive, using the optimizing subsystem, a compressed spectrum report comprising a local spectrum for the candidate CR as compressed using the pseudorandom sensing matrix, and originating from a second subset of the plurality of trusted SNs defined as test SNs;
  record, using the optimizing subsystem, a respective SN identifier (ID) for each of the test SNs to define a set $S_{EST}$;
  detect, using the matching subsystem, match between the respective spectra associated with the set $S_{TRUE}$ and the set $S_{EST}$ as recorded in the GDB to identify a third subset of the plurality of trusted SNs defined as matched SNs;
  record, using the matching subsystem, a respective SN identifier (ID) for each of the matched SNs to define a set $S_{MATCH}$; and
  determine, using the matching subsystem, a cardinality of the set $S_{MATCH}$ to define a matched sensors metric $\delta_{MATCH}$.

2. The system according to claim 1, where the plurality of instructions, when executed by the computer processor, further configure the system to determine, using the matching subsystem, a difference between a first reconstruction using $S_{MATCH}$ and a second reconstruction using $S_{TRUE}$ to define a reconstruction error metric $\delta_{RECON}$.

3. The system according to claim 2, where the plurality of instructions, when executed by the computer processor, further configure the system to:
  record, using the optimizing subsystem, a respective correlation sign for each of the set $S_{EST}$;
  detect, using the matching subsystem, negative correlation events in the correlation signs associated with the set $S_{MATCH}$ as recorded in the GDB to identify a fifth subset of the plurality of trusted SNs to define a set $S_{NEG}$;
  determine, using the matching subsystem, a cardinality of the set $S_{NEG}$ to define a negative correlations metric $\delta_{NEG}$; and
  divide, using the matching subsystem, the negative correlations metric $\delta_{NEG}$ by the matched sensors metric $\delta_{MATCH}$ to define a correlation sign metric $\delta_{SIGN}$.

4. The system according to claim 2, where the plurality of instructions, when executed by the computer processor, further define the system comprising a reporting subsystem and further configure the system to detect, using the matching subsystem, a location falsification condition in the matched sensors metric $\delta_{MATCH}$ and the reconstruction error metric $\delta_{RECON}$, collectively, and to at least one of:
  reject, using the reporting subsystem, the spectrum request associated with the candidate CR; and
  flag, using the reporting subsystem, the spectrum request as a spectrum spoofing attack.

5. The system according to claim 3, where the plurality of instructions, when executed by the computer processor, further define the system comprising a reporting subsystem and further configure the system to detect, using the matching subsystem, a negative correlation condition in the matched sensors metric $\delta_{MATCH}$, the reconstruction error metric $\delta_{RECON}$, and the correlation sign metric $\delta_{SIGN}$, collectively, and to at least one of:
  reject, using the reporting subsystem, the spectrum request associated with the candidate CR; and
  flag, using the reporting subsystem, the spectrum request as a spectrum inversion attack.

6. The system according to claim 2, where the plurality of instructions, when executed by the computer processor, further define the system comprising a reporting subsystem and further configure the system to detect, using the matching subsystem, a negative correlation condition in the matched sensors metric $\delta_{MATCH}$ and the reconstruction error metric $\delta_{RECON}$, collectively, and to at least one of:
  reject, using the reporting subsystem, the spectrum request associated with the candidate CR; and
  flag, using the reporting subsystem, the spectrum request as a spectrum shifting attack.

7. A computer-implemented method of spectrum sensing falsification detection (SSFD) for use with a cognitive radio network (CRN) characterized by a plurality of trusted sensor nodes (SNs) each associated with a respective sensitivity region, and a plurality of secondary user (SU) cognitive radio (CR) emitters each positioned within at least one of the plurality of sensitivity regions; the method comprising:
- recording to a geographic database (GDB) a respective spectrum report and a respective location associated with each of the plurality of trusted SNs;
- receiving a spectrum request associated with one of the plurality of SU CR emitters defined as a candidate cognitive radio (CR) and originating from a first subset of the plurality of trusted SNs defined as local SNs;
- recording a respective SN identifier (ID) for each of the local SNs to define a set $S_{TRUE}$;
- creating a pseudorandom sensing matrix from the GDB;
- receiving a compressed spectrum report comprising a local spectrum for the candidate CR as compressed using the pseudorandom sensing matrix, and originating from a second subset of the plurality of trusted SNs defined as test SNs;
- recording a respective SN identifier (ID) for each of the test SNs to define a set $S_{EST}$;
- detecting match between the respective spectra associated with the set $S_{TRUE}$ and the set $S_{EST}$ as recorded in the GDB to identify a third subset of the plurality of trusted SNs defined as matched SNs;
- recording a respective SN identifier (ID) for each of the matched SNs to define a set $S_{MATCH}$; and
- determining a cardinality of the set $S_{MATCH}$ to define a matched sensors metric $\delta_{MATCH}$.

8. The method according to claim 7, further comprising determining a difference between a first reconstruction using $S_{MATCH}$ and a second reconstruction using $S_{TRUE}$ to define a reconstruction error metric $\delta_{RECON}$.

9. The method according to claim 8, further comprising:
- recording a respective correlation sign for each of the set $S_{EST}$;
- detecting negative correlation events in the correlation signs associated with the set $S_{MATCH}$ as recorded in the GDB to identify a fifth subset of the plurality of trusted SNs to define a set $S_{NEG}$;
- determining a cardinality of the set $S_{NEG}$ to define a negative correlations metric $\delta_{NEG}$; and
- dividing the negative correlations metric $\delta_{NEG}$ by the matched sensors metric $\delta_{MATCH}$ to define a correlation sign metric $\delta_{SIGN}$.

10. The method according to claim 8, further comprising detecting a location falsification condition in the matched sensors metric $\delta_{MATCH}$ and the reconstruction error metric $\delta_{RECON}$, collectively, and at least one of:
- rejecting the spectrum request associated with the candidate CR; and
- flagging the spectrum request as a spectrum spoofing attack.

11. The method according to claim 9, further comprising detecting a negative correlation condition in the matched sensors metric $\delta_{MATCH}$, the reconstruction error metric $\delta_{RECON}$, and the correlation sign metric $\delta_{SIGN}$, collectively, and at least one of:
- rejecting the spectrum request associated with the candidate CR; and
- flagging the spectrum request as a spectrum inversion attack.

12. The method according to claim 8, further comprising detecting a negative correlation condition in the matched sensors metric $\delta_{MATCH}$ and the reconstruction error metric $\delta_{RECON}$, collectively, and at least one of:
- rejecting the spectrum request associated with the candidate CR; and
- flagging the spectrum request as a spectrum shifting attack.

13. A method of spectrum sensing falsification detection (SSFD), comprising:
- receiving a spectrum request associated with one of a plurality of SU CR emitters defined as a candidate cognitive radio (CR) and originating from a first subset of a plurality of trusted SNs defined as local SNs;
- defining a set $S_{TRUE}$ to comprise a respective SN identifier (ID) for each of the local SNs;
- creating a pseudorandom sensing matrix from a collection of a respective spectrum report and a respective location associated with each of the plurality of trusted SNs;
- receiving a compressed spectrum report comprising a local spectrum for the candidate CR as compressed using the pseudorandom sensing matrix, and originating from a second subset of the plurality of trusted SNs defined as test SNs;
- defining a set $S_{EST}$ to comprise a respective SN identifier (ID) for each of the test SNs;
- detecting match in the collection between the respective spectra associated with the set $S_{TRUE}$ and the set $S_{EST}$ to identify a third subset of the plurality of trusted SNs defined as matched SNs;
- defining a set $S_{MATCH}$ to comprise a respective SN identifier (ID) for each of the matched SNs; and
- determining a cardinality of the set $S_{MATCH}$ to define a matched sensors metric $\delta_{MATCH}$.

14. The method according to claim 13, further comprising:
- determining a difference between a first reconstruction using $S_{MATCH}$ and a second reconstruction using $S_{TRUE}$ to define a reconstruction error metric $\delta_{RECON}$.

15. The method according to claim 14, further comprising:
- detecting negative correlation events in a respective correlation signs associated with the set $S_{MATCH}$ to identify a fifth subset of the plurality of trusted SNs to define a set $S_{NEG}$;
- determining a cardinality of the set $S_{NEG}$ to define a negative correlations metric $\delta_{NEG}$; and
- dividing the negative correlations metric $\delta_{NEG}$ by the matched sensors metric $\delta_{MATCH}$ to define a correlation sign metric $\delta_{SIGN}$.

16. The method according to claim 14, further comprising detecting a location falsification condition in the matched sensors metric $\delta_{MATCH}$ and the reconstruction error metric $\delta_{RECON}$, collectively, and at least one of:
- rejecting the spectrum request associated with the candidate CR; and
- flagging the spectrum request as a spectrum spoofing attack.

17. The method according to claim 15, further comprising detecting a negative correlation condition in the matched sensors metric $\delta_{MATCH}$, the reconstruction error metric $\delta_{RECON}$, and the correlation sign metric $\delta_{SIGN}$, collectively, and at least one of:
- rejecting the spectrum request associated with the candidate CR; and
- flagging the spectrum request as a spectrum inversion attack.

18. The method according to claim 14, further comprising detecting a negative correlation condition in the matched sensors metric $\delta_{MATCH}$ and the reconstruction error metric $\delta_{RECON}$, collectively, and at least one of:
- rejecting the spectrum request associated with the candidate CR; and
- flagging the spectrum request as a spectrum shifting attack.

19. An improved cognitive radio network (CRN) having spectrum sensing falsification detection (SSFD), comprising:
- a plurality of trusted sensor nodes (SNs) each associated with a respective sensitivity region of the CRN;
- a plurality of secondary user (SU) cognitive radio (CR) emitters each positioned within at least one of the plurality of sensitivity regions; and
- a fusion center (FC) having a computer processor and computer-implementable instructions, said computer-implementable instructions being stored on a non-transitory medium which, when executed by said computer processor, configure the FC to:
  - record to a geographic database (GDB) a respective spectrum report and a respective location associated with each of the plurality of trusted SNs;
  - receive a spectrum request associated with one of the plurality of SU CR emitters defined as a candidate cognitive radio (CR) and originating from a first subset of the plurality of trusted SNs defined as local SNs;
  - record a respective SN identifier (ID) for each of the local SNs to define a set $S_{TRUE}$;
  - create a pseudorandom sensing matrix from the GDB;
  - receive a compressed spectrum report comprising a local spectrum for the candidate CR as compressed using the pseudorandom sensing matrix, and originating from a second subset of the plurality of trusted SNs defined as test SNs;
  - record a respective SN identifier (ID) for each of the test SNs to define a set $S_{EST}$;
  - detect match between the respective spectra associated with the set $S_{TRUE}$ and the set $S_{EST}$ as recorded in the GDB to identify a third subset of the plurality of trusted SNs defined as matched SNs;
  - record a respective SN identifier (ID) for each of the matched SNs to define a set $S_{MATCH}$; and
  - determine a cardinality of the set $S_{MATCH}$ to define a matched sensors metric $\delta_{MATCH}$.

20. The improved cognitive radio network (CRN) according to claim 19, where the plurality of instructions, when executed by the computer processor, further configure the FC to determine a difference between a first reconstruction using $S_{MATCH}$ and a second reconstruction using $S_{TRUE}$ to define a reconstruction error metric $\delta_{RECON}$.

* * * * *